United States Patent
Krishnamoorthy et al.

(10) Patent No.: US 9,825,840 B2
(45) Date of Patent: Nov. 21, 2017

(54) LINK-QUALITY-BASED RESOURCE ALLOCATION IN DEVICE-TO-DEVICE COMMUNICATIONS

(71) Applicant: QUALCOMM Incorporated, San Diego, CA (US)

(72) Inventors: Parthasarathy Krishnamoorthy, San Diego, CA (US); Anand Rajurkar, Hyderabad (IN); Prashanth Mohan, Hyderabad (IN); Aravinth Rajendran, Hyderabad (IN); Nithin Thilak Nallasivam, Tamil Nadu (IN); Janga Reddy Alimineti, Hyderabad (IN); KrishnaKumar Vasanthasenan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 14/801,963

(22) Filed: Jul. 17, 2015

(65) Prior Publication Data
US 2017/0019904 A1    Jan. 19, 2017

(51) Int. Cl.
*H04L 12/26* (2006.01)
*H04W 4/00* (2009.01)
(Continued)

(52) U.S. Cl.
CPC .............. *H04L 43/16* (2013.01); *H04W 4/005* (2013.01); *H04W 72/085* (2013.01); *H04W 76/023* (2013.01)

(58) Field of Classification Search
CPC ... H04W 72/08; H04W 72/085; H04W 4/005; H04W 72/1226; H04W 72/1231; H04L 43/16
See application file for complete search history.

(56) References Cited

U.S. PATENT DOCUMENTS 8,504,052 B2    8/2013    Hakola et al.
8,914,054 B2    12/2014   Dimou et al.
(Continued)

FOREIGN PATENT DOCUMENTS

WO    2015014395 A1    2/2015

OTHER PUBLICATIONS

International Search Report and Written Opinion—PCT/US2016/034009—ISA/EPO—dated Aug. 5, 2016.

*Primary Examiner* — Paul H Masur
(74) *Attorney, Agent, or Firm* — MG-IP Law, P.C.

(57) ABSTRACT

A method for improving device-to-device (D2D) communication in an LTE-Direct communication system includes exchanging communication information between a first user equipment (UE) and a second UE over an LTE-Direct connection with a first network resource of a first set of network resources allocated to the first and second UEs by a base station for the LTE-Direct connection. The method also includes determining, by the first UE, whether a first link quality of the LTE-Direct connection with the first network resource is below a link quality threshold. If so, the LTE-Direct connection is shifted to another network resource of the first set of network resources until an LTE-Direct connection is established that has a link quality that is equal to or greater than the link quality threshold.

30 Claims, 9 Drawing Sheets

(51) Int. Cl.
*H04W 72/08* (2009.01)
*H04W 76/02* (2009.01)

(56) References Cited

U.S. PATENT DOCUMENTS

| | | |
|---|---|---|
| 8,953,531 B2 | 2/2015 | Oh et al. |
| 2010/0261469 A1 | 10/2010 | Ribeiro et al. |
| 2013/0315079 A1 | 11/2013 | Edge et al. |
| 2014/0135019 A1 | 5/2014 | Jang et al. |
| 2014/0213221 A1* | 7/2014 | Chai ............... H04W 36/30 455/411 |
| 2015/0133132 A1* | 5/2015 | Li ................... H04L 1/0002 455/450 |
| 2015/0173060 A1 | 6/2015 | Ge et al. |
| 2015/0201392 A1 | 7/2015 | Sartori et al. |
| 2015/0282184 A1* | 10/2015 | Yang ............... H04W 52/265 455/513 |
| 2015/0373719 A1* | 12/2015 | Xu .................. H04W 72/04 370/329 |
| 2016/0081073 A1* | 3/2016 | Lindoff ........... H04W 72/1257 370/329 |
| 2016/0135201 A1* | 5/2016 | Brahmi ............ H04L 5/006 370/329 |
| 2016/0150426 A1* | 5/2016 | Panaitopol ....... H04W 24/08 370/252 |
| 2016/0183121 A1* | 6/2016 | Kazmi .............. H04W 28/18 370/230 |
| 2016/0198414 A1* | 7/2016 | Yano ................ H04W 52/383 455/522 |
| 2016/0234789 A1* | 8/2016 | Oh .................. H04W 52/241 |

* cited by examiner

LINK-QUALITY-BASED RESOURCE ALLOCATION IN DEVICE-TO-DEVICE COMMUNICATIONS

TECHNICAL FIELD

The various aspects and embodiments described herein generally relate to device-to-device (D2D) communication, and in particular, to network resource allocation for device-to-device (D2D) communication in an LTE-Direct communication system.

BACKGROUND

Wireless communication systems are widely deployed to provide various types of communication content, including voice, video, packet data, messaging, and broadcast, among many others. Wireless communication systems (e.g., multiple-access networks that can share available network resources to support multiple users) have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different wireless communication systems in use, including Cellular and Personal Communications Service (PCS) systems. Example cellular systems include the cellular Analog Advanced Mobile Phone System (AMPS), digital cellular systems based on Code Division Multiple Access (CDMA), Frequency Division Multiple Access (FDMA), Time Division Multiple Access (TDMA), Orthogonal FDMA (OFDMA), Single-Carrier FDMA (SC-FDMA), the Global System for Mobile access (GSM) TDMA variation, and newer hybrid digital communication systems that use both TDMA and CDMA technologies. More recently, Long Term Evolution (LTE) has been developed as a wireless communication protocol for wireless communication of high-speed data for mobile phones and other data terminals. LTE is based on GSM, and includes contributions from various GSM-related protocols (e.g., Enhanced Data rates for GSM Evolution (EDGE)) and Universal Mobile Telecommunications System (UMTS) protocols (e.g., High-Speed Packet Access (HSPA)).

In general, a wireless communication network may include various base stations (also referred to as evolved node Bs, eNBs, or access nodes) that can support communication for various user equipments (UEs). In a WAN, a UE typically communicates via uplink/downlink channels between the UE and a base station to thereby communicate with the base station. However, if two UEs are in within sufficient proximity to one another, the UEs may be enabled to communicate directly, that is, without communicating through any base station. A UE may therefore support direct peer-to-peer (P2P) or device-to-device (D2D) communication with one or more other UEs. For example, LTE Direct (LTE-D, sometimes also referred to as "LTE-Advanced") is a proposed 3GPP (Release 12) D2D solution for proximate discovery. LTE-Direct dispenses with location tracking and network calls by directly monitoring for services on other LTE-Direct devices within a large range (~500 m, line of sight). Accordingly, among other advantages, LTE-Direct can directly monitor for services on other LTE-Direct devices in a synchronous system and concurrently detect potentially thousands of services in proximity in a continuous and battery efficient manner.

LTE-Direct operates on licensed spectrum as a service to mobile applications and provides D2D solution that enables service layer discovery. Mobile applications on LTE-Direct devices can instruct LTE-Direct to monitor for mobile application services on other devices and announce their own services at the physical layer for detection by services on other LTE-Direct devices, which allows the applications to be closed while LTE-Direct does the work in a substantially continuous manner and notifies the client application when a match to the monitor is detected. Accordingly, LTE-Direct is an attractive alternative to mobile developers seeking to deploy proximate discovery solutions to extend their existing services. For example, LTE-Direct is a distributed discovery solution (versus the centralized discovery that exists today), whereby mobile applications may forego centralized database processing in identifying relevancy matches because relevance may instead be determined autonomously at the device level via transmitting and monitoring for relevant attributes. LTE-Direct offers additional power consumption benefits because LTE-Direct does not perpetually track location to determine proximity and privacy benefits because discovery may be kept on the device such that users have more control over information shared with external devices.

Furthermore, LTE-Direct can increase network efficiency because devices communicate directly using cellular spectrum without utilizing the cellular network infrastructure. As such, because LTE-Direct uses licensed cellular spectrum, cellular coverage can be extended and interference from other devices can be controlled (unlike D2D communication in unlicensed bands). Accordingly, LTE-Direct may use direct connections to transfer substantial data between LTE-Direct enabled devices that are within sufficient proximity, thereby offloading traffic from the network infrastructure. Moreover, in addition to allowing high data transfer rates, LTE-Direct offers low delays and low energy consumption at the UEs communicating over an LTE-Direct link. Furthermore, LTE-Direct offers applications in national security and public safety networks because LTE provides high data rates that can enable real-time data and multimedia exchange between emergency personnel in crisis situations and the D2D functionality can improve performance in LTE-based public safety networks in the event that the LTE infrastructure may be totally or partially disabled (e.g., in disaster scenarios such as earthquakes, hurricanes, terrorist attacks, etc.).

Accordingly, techniques to efficiently support D2D communication are desired to enable new services, improve existing services, eliminate and/or reduce interference, and/or reduce traffic load on network infrastructures, among other things.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to one aspect, a method for improving device-to-device (D2D) communication in an LTE-Direct communication system includes exchanging communication information between a first user equipment (UE) and a second UE over an LTE-Direct connection with a first network resource of a first set of network resources allocated to the first and second UEs by a base station for the LTE-Direct connection. The method also includes determining, by the first UE, whether a first link quality of the LTE-Direct connection with the first network resource is below a link quality threshold. If so, the LTE-Direct connection is shifted to another network resource of the first set of network resources until an LTE-Direct connection is established that has a link quality that is equal to or greater than the link quality threshold.

According to another aspect, an apparatus for allocating network resources for device-to-device (D2D) communication in an LTE-Direct communication system includes memory adapted to store program code a processing unit coupled to the memory to access and execute instructions included in the program code. The instructions direct the apparatus to exchange communication information between a first user equipment (UE) and a second UE over an LTE-Direct connection with a first network resource of a first set of network resources allocated to the first and second UEs by a base station for the LTE-Direct connection; determine, by the first UE, whether a first link quality of the LTE-Direct connection with the first network resource is below a link quality threshold; and if so, shift the LTE-Direct connection to another network resource of the first set of network resources until an LTE-Direct connection is established between the first UE and the second UE that has a link quality that is equal to or greater than the link quality threshold.

According to yet another aspect, an apparatus for allocating network resources for device-to-device (D2D) communication in an LTE-Direct communication system includes means for exchanging communication information between a first user equipment (UE) and a second UE over an LTE-Direct connection with a first network resource of a first set of network resources allocated to the first and second UEs by a base station for the LTE-Direct connection; means for determining, by the first UE, whether a first link quality of the LTE-Direct connection with the first network resource is below a link quality threshold; and means for shifting the LTE-Direct connection to another network resource of the first set of network resources until an LTE-Direct connection is established between the first UE and the second UE that has a link quality that is equal to or greater than the link quality threshold.

According to another aspect, a non-transitory computer-readable medium includes program code stored thereon for allocating network resources for device-to-device (D2D) communication in an LTE-Direct communication system. The program code includes instructions to: exchange communication information between a first user equipment (UE) and a second UE over an LTE-Direct connection with a first network resource of a first set of network resources allocated to the first and second UEs by a base station for the LTE-Direct connection; determine, by the first UE, whether a first link quality of the LTE-Direct connection with the first network resource is below a link quality threshold; and if so, shift the LTE-Direct connection to another network resource of the first set of network resources until an LTE-Direct connection is established between the first UE and the second UE that has a link quality that is equal to or greater than the link quality threshold.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
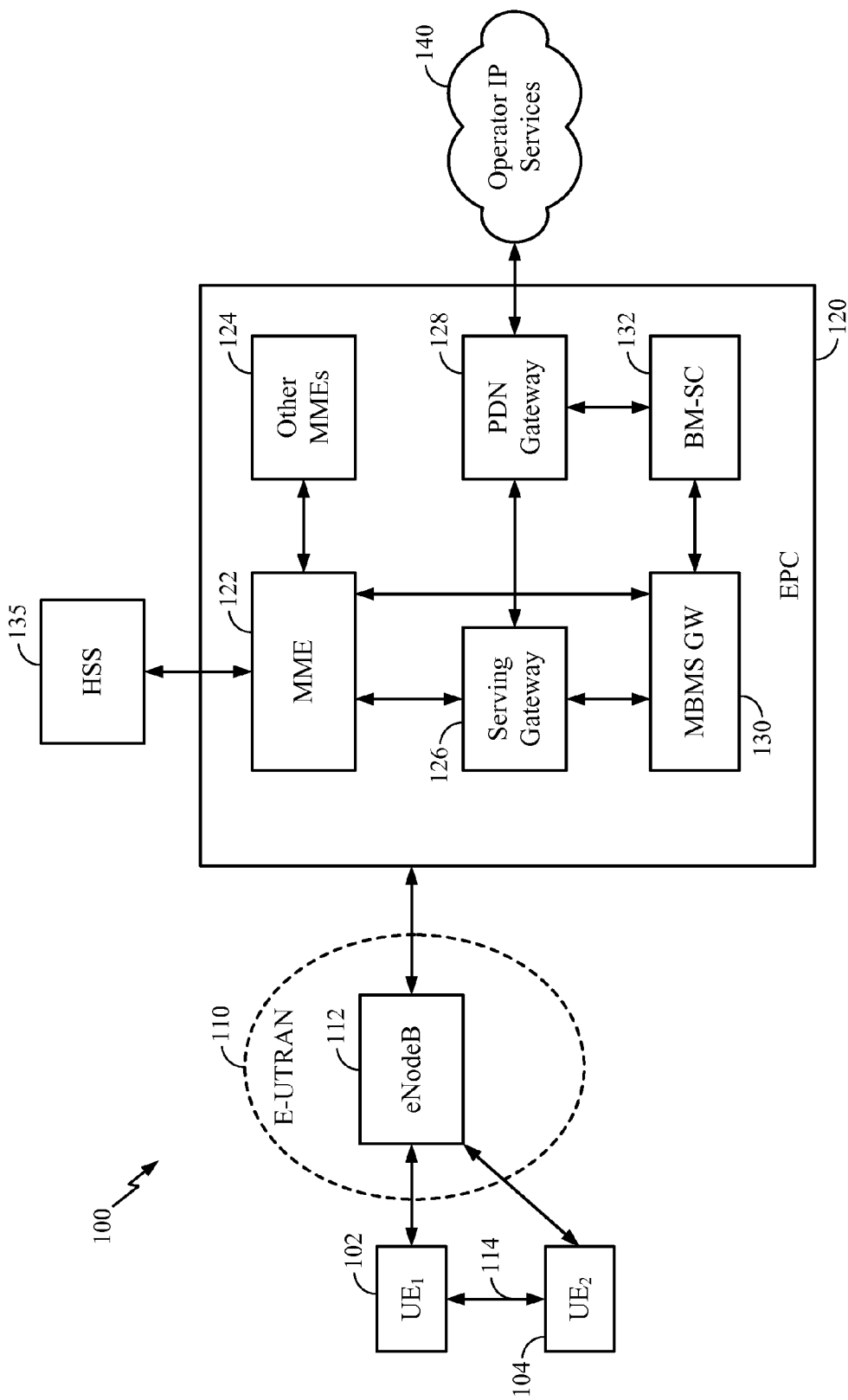
FIG. 1 is a functional block diagram illustrating an example wireless network architecture supporting device-to-device (D2D) communication, according to various aspects.

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

The techniques described herein may be used in connection with various wireless communication systems such as CDMA, TDMA, FDMA, OFDMA, and SC-FDMA systems. The terms "system" and "network" are often used interchangeably. A CDMA system may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE, and GSM are described in documents from an organization named "3rd Generation Partnership Project" (3GPP). CDMA2000 and UMB are described in documents from an organization named "3rd Generation Partnership Project 2" (3GPP2). For clarity, certain aspects are described below for LTE, and LTE terminology may be used in much of the description below.

According to various aspects, FIG. 1 illustrates an exemplary wireless network architecture 100 that may support device-to-device (D2D) communication, wherein the wireless network architecture 100 may comprise a Long Term Evolution (LTE) (or Evolved Packet System (EPS)) network architecture 100. In various embodiments, the wireless network architecture 100 may include a first user equipment ($UE_1$) 102, a second user equipment ($UE_2$) 104, an Evolved UMTS Terrestrial Radio Access Network (E-UTRAN) 110, an Evolved Packet Core (EPC) 120, a Home Subscriber Server (HSS) 135, and Internet Protocol (IP) Services 140 associated with an operator (e.g., a mobile network operator (MNO)). The wireless network architecture 100 can interconnect with other access networks and core networks (not shown), such as a UMTS access network or an IP core network. As shown, the wireless network architecture 100 provides packet-switched services; however, those skilled in the art will readily appreciate that the various concepts disclosed herein may be extended to networks that provide circuit-switched services.

In various embodiments, implementation, the E-UTRAN 110 may include a first evolved Node B (eNB) 112 in communication with $UE_1$ 102 and with $UE_2$ 104. The eNB 112 may provide user and control plane protocol terminations toward the UEs 102, 104 and may be connected to with other eNBs via a backhaul (e.g., an X2 interface). The eNB 112 may also be referred to as a base station, Node B, access points, base transceiver station, radio base station, radio transceiver, transceiver function, a basic service set (BSS), an extended service set (ESS), or some other suitable terminology. The eNB 112 provides an access point to the EPC 120 for the UEs 102, 104. Example UEs 102, 104 may include, without limitation, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. Furthermore, those skilled in the art will appreciate that the UE 102 and/or UE 104 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, etc.

The eNB 112 may connect to the EPC 120 via an Si interface, wherein the EPC 120 may include a Mobility Management Entity (MME) 122, other MMEs 124, a Serving Gateway 126, a Multimedia Broadcast Multicast Service (MBMS) Gateway 130, a Broadcast Multicast Service Center (BM-SC) 132, and a Packet Data Network (PDN) Gateway 128. The MME 122 is the control node that processes the signaling between the UEs 102, 104 and the EPC 120. Generally, the MME 122 provides bearer and connection management. All user IP packets are transferred through the Serving Gateway 126, which may be connected to the PDN Gateway 128. The PDN Gateway 128 provides UE IP address allocation as well as other functions. The PDN Gateway 128 is connected to the Operator IP Services 140, which may include the Internet, an intranet, an IP Multimedia Subsystem (IMS), and a PS Streaming Service (PSS). The BM-SC 132 may provide functions for MBMS user service provisioning and delivery. The BM-SC 132 may serve as an entry point for content provider MBMS transmission, may be used to authorize and initiate MBMS Bearer Services within a PLMN, and may be used to schedule and deliver MBMS transmissions. The MBMS Gateway 130 may be used to distribute MBMS traffic to eNBs (e.g., 112) belonging to a Multicast Broadcast Single Frequency Network (MBSFN) area broadcasting a particular service, and may be responsible for session management (start/stop) and for collecting eMBMS related charging information.

In various embodiments, a UE pair (e.g., $UE_1$ 102 and $UE_2$ 104) may establish a device-to-device (D2D) connection 114 to communicate directly without an intervening eNB (e.g., eNB 112) and subsequently transfer data traffic over the D2D connection 114. In general, one or more entities in the network infrastructure (e.g., eNB 112, entities in the EPC 120, etc.) may coordinate the D2D communication between the UE pair 102, 104, in that the network entities may assist in establishing the D2D connection, control use in a D2D mode versus a legacy mode, provide security support, etc. As used herein, the term "D2D mode" and variants thereof may generally refer to direct communication between two or more UEs 102, 104, and the term "legacy mode" and variants thereof may generally refer to communication between two or more UEs 102, 104 via the network (e.g., via the eNB 112). In various embodiments, the UE pair 102, 104 may establish the D2D mode autonomously, wherein initial discovery and establishing the D2D connection may be based on an ability to communicate signals directly between the UEs 102, 104. Additionally or in the alternative, UEs that are attached to a network that does not support the D2D mode but permits the D2D mode, the UEs 102, 104 may connect via the network and exchange serving cell and location information to determine whether the D2D mode is possible. Once the D2D mode is in progress, one or more UEs 102, 104 may monitor relative locations associated therewith. Furthermore, a group including three or more UEs may enter D2D mode whereby some or all UE pairs in the group may maintain direct D2D communication between one another and whereby some UEs in the group may act as relays to relay D2D communication between other UEs in the group. For example, one UE in the group may be designated to operate in a relay role to maintain direct D2D communication with the two other UEs in the group and act as a relay to enable the other two UEs to communicate indirectly via D2D communication. In this example, the UE operating in the relay role may relay communication between UEs in the group. A group that includes several UEs employing D2D communication between one another may monitor relative locations associated therewith and assign (and/or reassign) the relay role to any UE based on the current relative locations associated therewith.

In another aspect of wireless network architecture 100, the network may assist the two or more UEs 102, 104 to enter the D2D mode in cases where the legacy mode may be unavailable and/or impossible (e.g., if the network is congested or portions thereof have temporarily failed or do not provide continuous radio coverage to both UEs 102, 104). In another aspect, the network (e.g., one or more network entities) may control entry to the D2D mode and support handover between the D2D mode and legacy mode.

Discovery in LTE-Direct operates in a synchronous manner based on parameters that are configured by the LTE network itself. By way of example, the serving eNB may broadcast a Session Information Block (SIB) during a discovery period to the UEs that includes information about discovery resource allocation. In one example, the SIB includes a set of network resources, such as Physical Uplink Shared Channel (PUSCH) resource blocks that may be used by the UEs for D2D communication.

Figure 2:
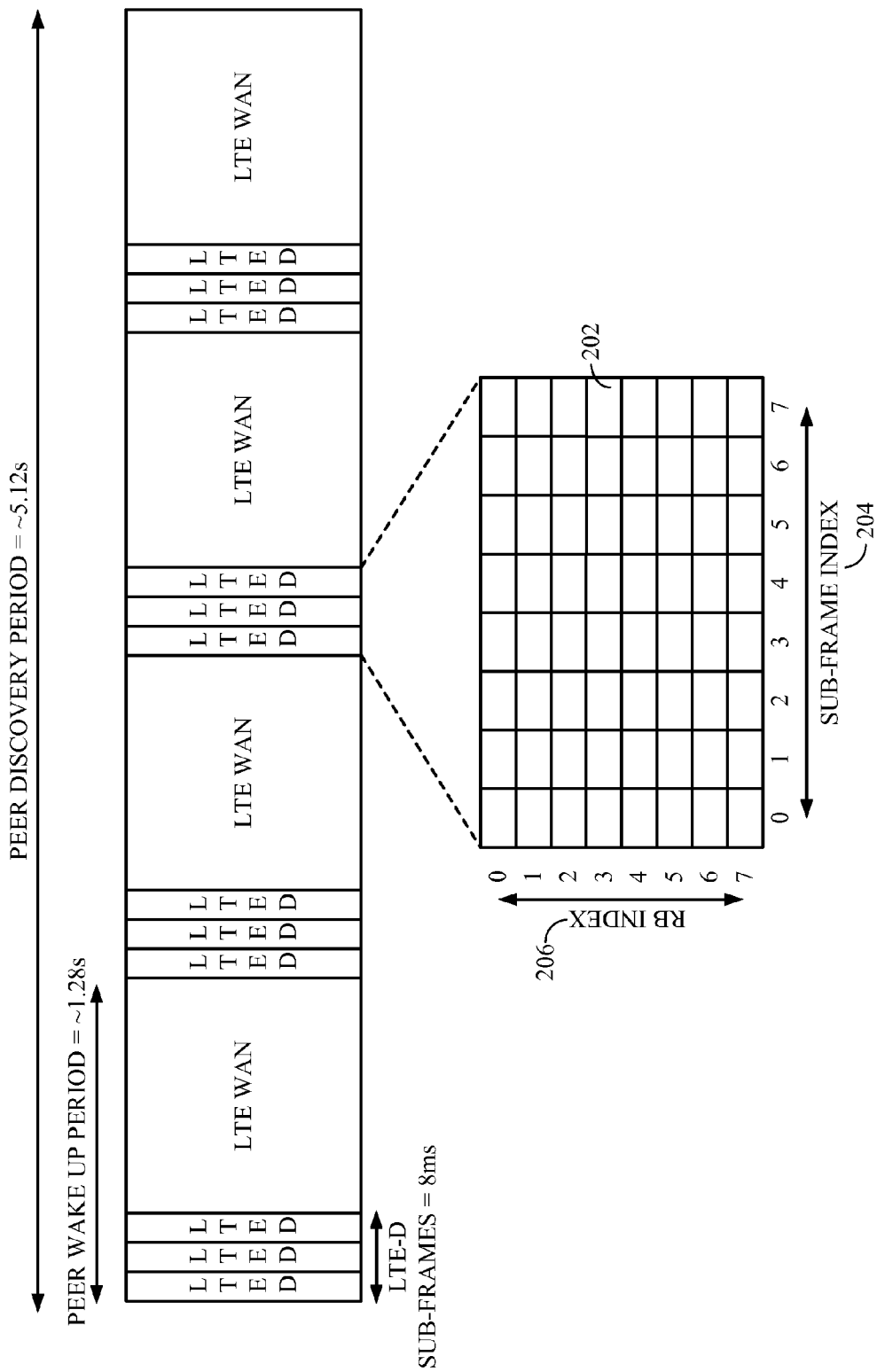
FIG. 2 illustrates an example frame structure for LTE-Direct resource allocation, according to various aspects.

FIG. 2 illustrates an example frame structure for LTE-Direct resource allocation, according to various aspects. The structure of FIG. 2 illustrates the frame structure of one discovery period broadcast by a base station (e.g., eNB) for the allocation of resource blocks to one or more UEs. In the configuration of FIG. 2, each discovery period may include four (4) wake-up periods including a series of subframes, such as subframes for LTE-D resource allocations, as well as subframes for LTE-WAN communications.

In one aspect, the LTE-WAN subframes in the peer discovery period may be used for uplink communications transmitted by a UE and received by a base station (e.g., an eNB). Similarly, the LTE-D subframes include shared uplink resource blocks to be used for D2D communications among a D2D pair (e.g., $UE_1$ and $UE_2$). FIG. 2 illustrates the LTE-D subframes as contiguous 3 blocks within each peer wake-up period. Thus, each wake-up period includes eight (8) LTE-D subframes, each with eight (8) resource blocks, for a total of sixty-four (64) discovery resources (e.g., network resource 202) per wake-up period. With four (4) wake-up periods per peer discovery period, the UE may be allocated up to 256 discovery resources, each referred to by a resource block index 206 and a sub-frame index 204, to arrive at a discovery resource ID (DRID) for each allocated network resource.

Upon allocation of the network resources, the UE may commence discovery and attempt to establish a D2D connection using at least one of the received network resources. In at least one embodiment, after two or more LTE-Direct devices discover each other and wish to establish an LTE-Direct session for communication, the LTE network may be required to authorize establishment of the LTE-Direct session, referred to herein as network assisted connection setup. If the LTE network authorizes the LTE-Direct session, the actual media is exchanged via D2D communication between the LTE-Direct devices with using at least one of the allocated resource blocks. However, the allocated resource blocks are shared Uplink resources of the eNB, and thus, the D2D communications between UEs may suffer from strong interference with other UEs in the cell, especially when those other UEs are transmitting at higher power with respect to the eNB. Such interference may degrade the link quality and/or lead to D2D service outages. Accordingly, aspects disclosed herein address this problem by providing link-quality-based resource allocation for D2D communications.

Figure 3:
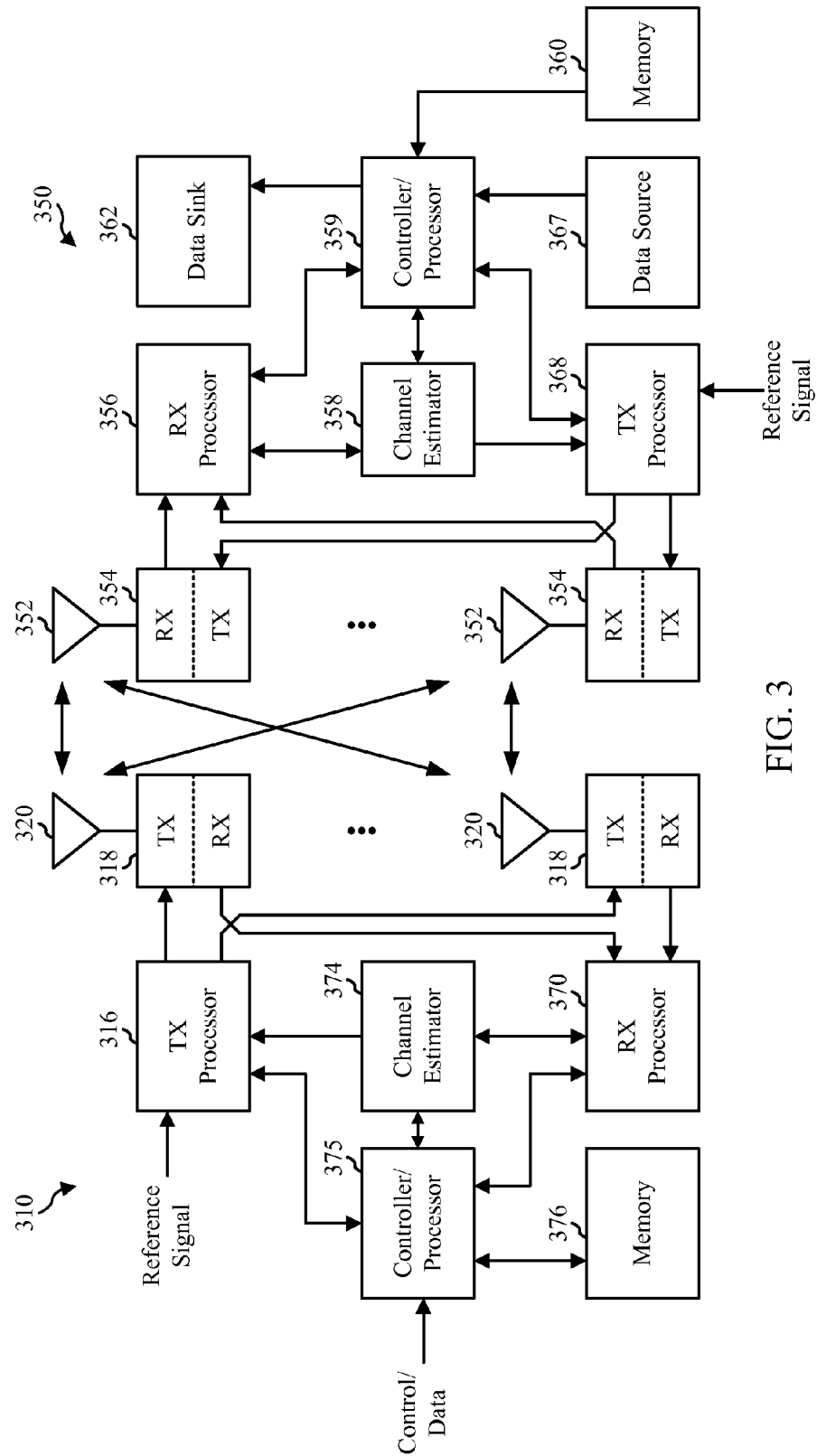
FIG. 3 is a functional block diagram illustrating an example evolved Node B (eNB) and user equipment (UE) in an access network, according to various aspects.

FIG. 3 is a functional block diagram illustrating an example evolved Node B (eNB) 310 and user equipment (UE) 650 in an access network, according to various aspects. UE 350 is one possible implementation of UE 102 or 104 in FIG. 1 and the eNB 310 is one possible implementation of eNB 112.

On the downlink (DL), upper layer packets from the core network are provided to a controller/processor 375 that implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 620 via a separate transmitter TX 318. Each transmitter TX 318 modulates an RF carrier with a respective spatial stream for transmission.

At the UE 350, each receiver RX 354 receives a signal through its respective antenna 352. Each receiver RX 354 recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the LTE network entity (eNB 310). These soft decisions may be based on channel estimates computed by the channel estimator 358. The soft decisions are then decoded and deinterleaved to recover the data and control signals that were originally transmitted by the LTE network entity (eNB 310) on the physical channel. The data and control signals are then provided to the controller/processor 359.

The controller/processor 359 implements the L2 layer, wherein the controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL direction, a data source 367 in UE 350 is used to provide upper layer packets to the controller/processor 359. The data source 367 represents all protocol layers above the L2 layer. Similar to the functionality described in connection with the DL transmission by the LTE network entity 310, the controller/processor 359 implements the L2 layer for the user plane and the control plane by providing header compression, ciphering, packet segmentation and reordering, and multiplexing between logical and transport channels based on radio resource allocations by the LTE network entity 310. The controller/processor 359 is also responsible for HARQ operations, retransmission of lost packets, and signaling to the LTE network entity 310.

Channel estimates derived by a channel estimator 358 from a reference signal or feedback transmitted by the LTE network entity 310 may be used by the TX processor 368 to select the appropriate coding and modulation schemes, and to facilitate spatial processing. The spatial streams generated by the TX processor 368 are provided to different antenna 352 via separate transmitters TX 354. Each transmitter TX 354 modulates an RF carrier with a respective spatial stream for transmission.

The UL transmission is processed at the LTE network entity 310 in a manner similar to that described in connection with the receiver function at the UE 350. Each receiver RX 318 receives a signal through its respective antenna 320. Each receiver RX 318 recovers information modulated onto an RF carrier and provides the information to a RX processor 370. The RX processor 370 may implement the L1 layer.

The controller/processor 375 implements the L2 layer, wherein the controller/processor 375 can be associated with a memory 376 that stores program codes and data. The memory 376 may be referred to as a computer-readable medium. In the UL, the control/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
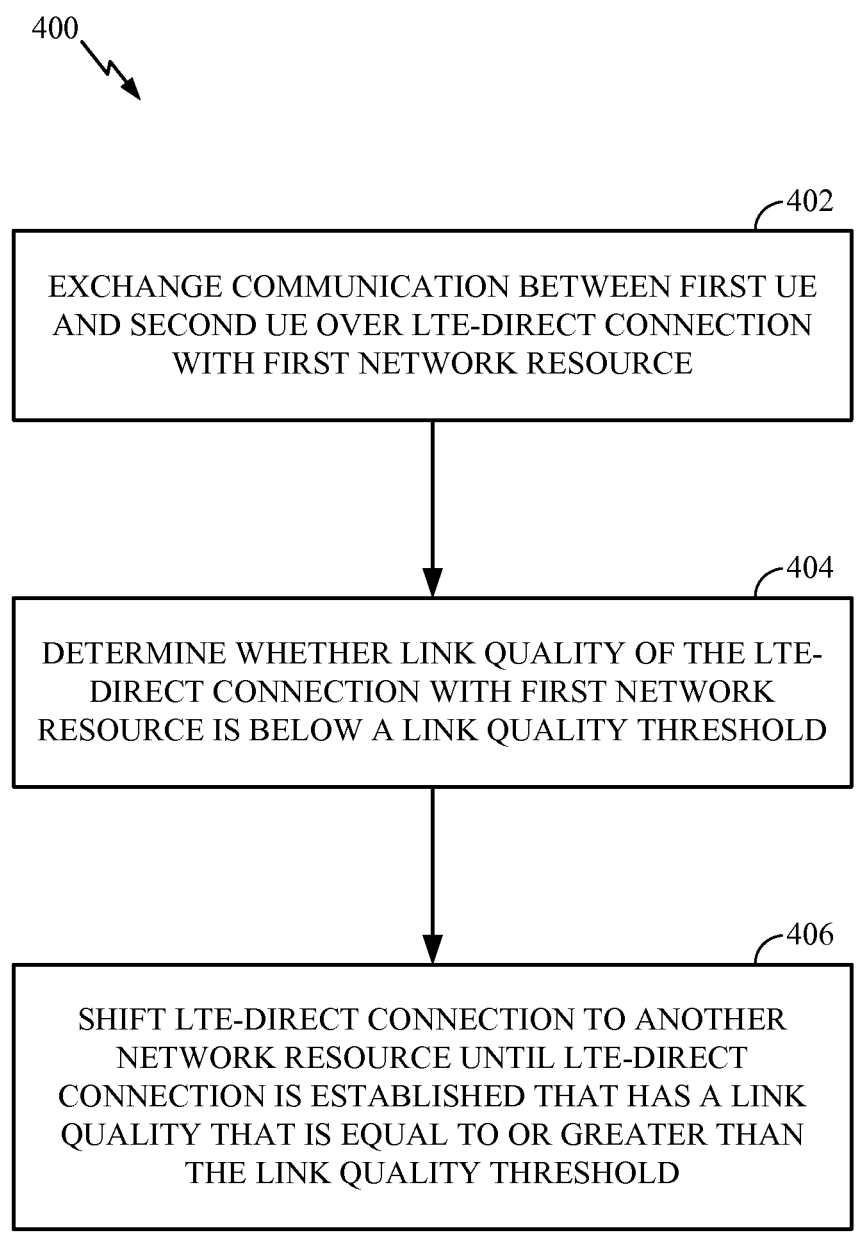
FIG. 4 is a flowchart illustrating an example process of link-quality-based resource allocation in a D2D communication session, according to various aspects.

FIG. 4 is a flowchart illustrating an example process 400 of link-quality-based resource allocation in a D2D communication session, according to various aspects. Process 400 is one possible process performed by UE 102 and/or UE 104 of FIG. 1. In process block 402, communications are exchanged between a first UE and a second UE over an LTE-Direct connection with a first network resource (e.g., network resource 202). As mentioned above, a set of resources are received from an eNB for use by the D2D pair in the D2D communication. Thus, the first network resource is selected by the first UE from this first set of network resources and then establishes the LTE-Direct connection with the second UE. As mentioned above, however, the allocated network resources are shared Uplink resources of the eNB, and thus, the D2D communications between UEs may suffer from strong interference with other UEs in the cell. Accordingly, after establishment of the LTE-Direct connection and the exchange of communication, process 400 includes process block 404 for determining, at the first UE, whether a first link quality of the LTE-Direct connection with the first network resource is below a link quality threshold. In one example, determining the link quality threshold includes measuring, by the first UE, one or more communication parameters of the LTE-Direct connection, such as reference signal received power (RSRP) and the signal to noise ratio (SNR) of the communication information exchanged between the first UE and the second UE.

If the link quality of the LTE-Direct connection with the first network resource is below the link quality threshold, then process block 406 proceeds by shifting the LTE-Direct connection to another of the network resources contained in the first set of network resources received from the eNB (e.g., base station). In one embodiment, the shifting of the LTE-Direct connection includes the first UE sending a private expression through the existing LTE-Direct connection to the second UE to indicate a change to a new DRID. Process block 406 may continue shifting the network resources of the LTE-Direct connection until a connection is established that has a link quality that is equal to or greater than the link quality threshold. Thus, process 400 provides for a mechanism that will help both UEs of the D2D pair, as well as other UEs in the cell to achieve better throughput and improve overall system capacity. Further details of process 400 will be described below with reference to processes 500, 600, and 700.

Figure 5:
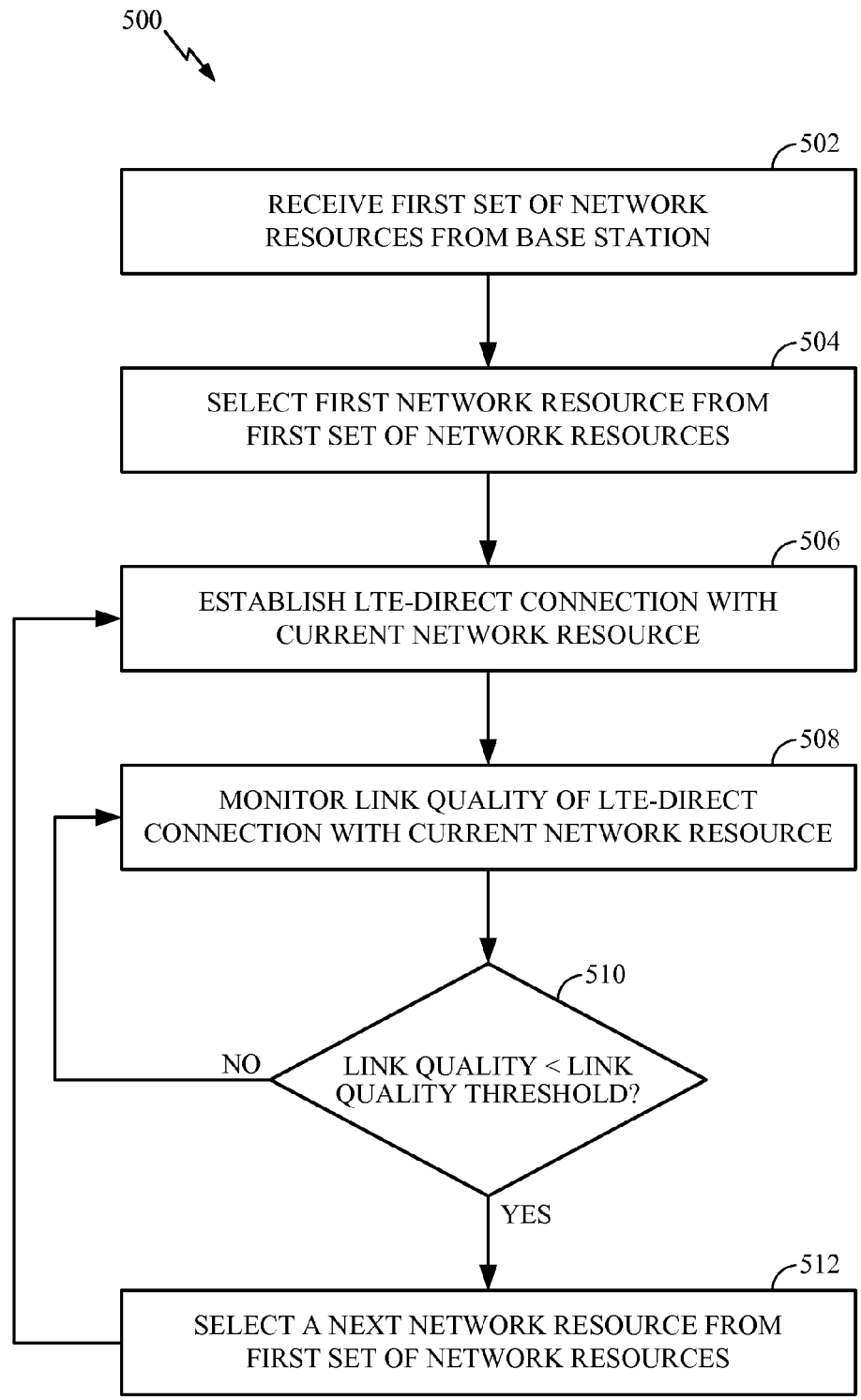
FIG. 5 is a flowchart illustrating an example process of link-quality-based resource allocation in a D2D communication session, according to various aspects.

FIG. 5 is a flowchart illustrating an example process 500 of link-quality-based resource allocation in a D2D communication session, according to various aspects. Process 500 is one possible process performed by UE 102 and/or UE 104 of FIG. 1. In process block 502, a UE, such as UE 102 and/or UE 104, receives a first set of network resources from a base station, such as eNB 112. In one embodiment, the first set of network resources are received by the UE during a peer discovery period, such as shown in FIG. 2. Next, the UE selects a first network resource (e.g., network resource 202) from the first set of network resources (i.e., process block 504). In process block 506, an LTE-direct connection is established between the first UE and the second UE using the currently selected (i.e., the first) network resource. In process block 508, the first UE monitors the link quality of the LTE-Direct connection with the currently selected network resource. In one embodiment, the first UE is configured to periodically measure one or more communication parameters of the LTE-Direct connection in order to determine the link quality. In decision block 510, the first UE determines whether the link quality of the LTE-Direct connection with the currently selected network resource is below a link quality threshold. If no, indicating that the link quality is satisfactory, process 500 then proceeds back to process block 508, where D2D communications continue on the currently selected network resource and the first UE continues to monitor the link quality. If however, the link quality of the LTE-Direct connection is below the link quality threshold, then process 500 proceeds to process block 512 which includes selecting a next network resource from the first set of resources.

A link quality that is below the link quality threshold indicates high interference in the LTE-Direct connection. In one example, the link quality threshold is a static value that is determined empirically. However, in another example, the link quality threshold may dynamically change during operation depending on the implementation. For example, the link quality threshold may vary from network to network, and/or may vary depending on the number of resources included in the first set of network resources allocated by the base station.

Process 500 then returns to process block 506, where the LTE-Direct connection is shifted by establishing the LTE-Direct connection using the newly selected network resource. Process 500 continues with selecting network resources, shifting the LTE-Direct connection, and monitoring the resultant link quality until a connection is established that has a link quality greater than the link quality threshold. In one embodiment, selecting the next network resource from the first set of network resources includes selecting a random network resource from the first set of network resources to be used for the shifting of the LTE-Direct connection.

Figure 6:
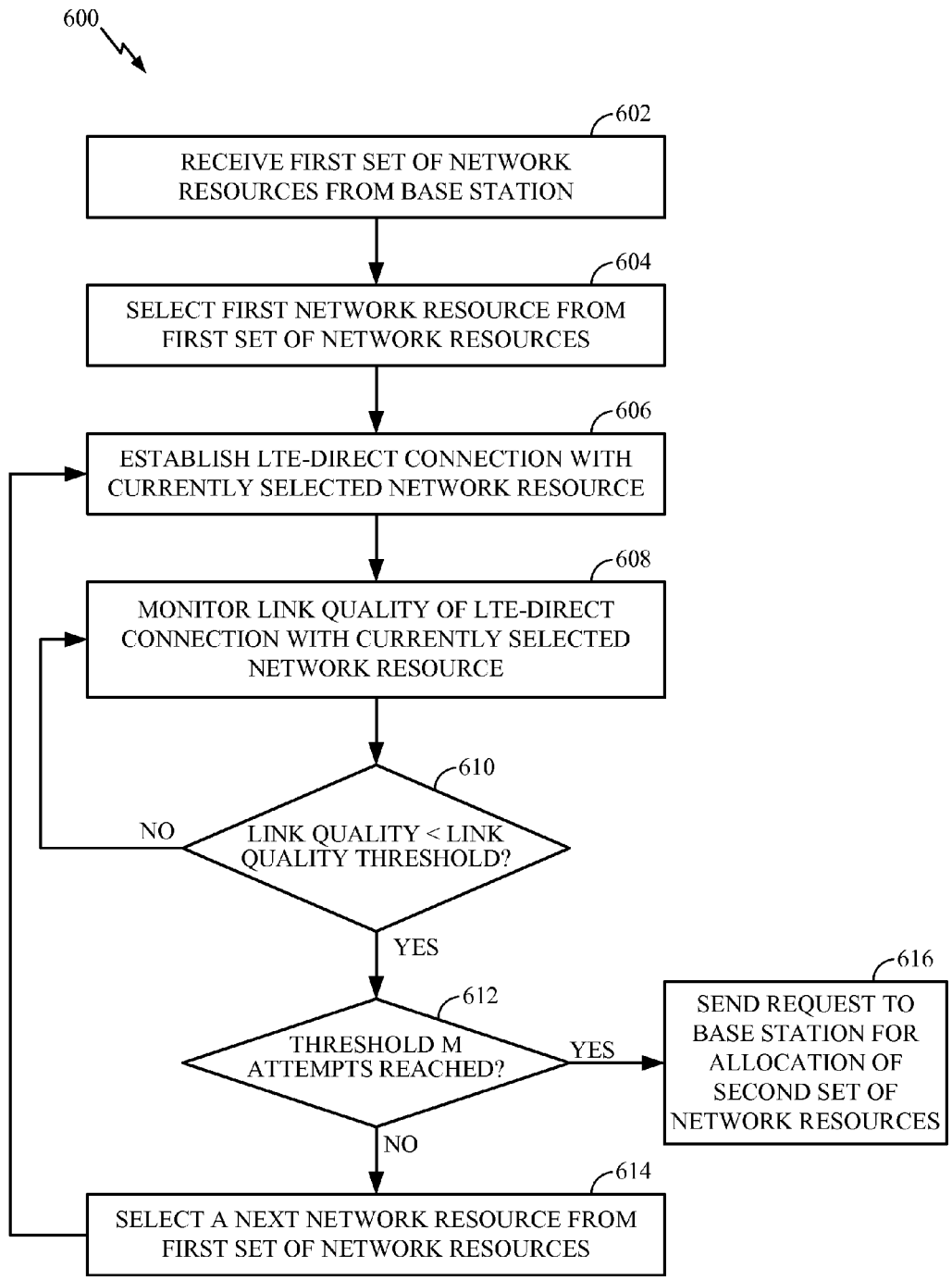
FIG. 6 is a flowchart illustrating an example process of link-quality-based resource allocation, including base station assistance, in a D2D communication session, according to various aspects.

FIG. 6 is a flowchart illustrating an example process 600 of link-quality-based resource allocation, including base station assistance, in a D2D communication session, according to various aspects. Process 600 is one possible process performed by UE 102 and/or UE 104 of FIG. 1. Process 600 is similar to process 500, described above, with process blocks 602-610, and 614 corresponding to process blocks 502-510, and 512, respectively. However, process 500 includes an additional aspect of limiting the number of attempts of shifting the LTE-Direct connection to a threshold number M. That is, the first UE may limit the number of network resources from the first set of resources that the first UE will attempt to shift the LTE-Direct connection to for the purposes of trying to find a suitable LTE-Direct connection. For example, in decision block 612, the first UE determines whether a threshold number M attempts to shift the LTE-Direct connection has been reached. If so, process 600 proceeds to process block 616 where the first UE sends a request to the base station for the allocation of a new second set of network resources. Upon receipt of the second set of network resources process 600 may repeat, by selecting one network resource of the second set of network resources, establishing an LTE-Direct connection, and monitoring the resultant link quality.

In one example, the threshold number M is a static value. However, in another example, the threshold number M may dynamically change during operation depending on the implementation. For example, the threshold number M may vary from network to network, and/or may vary depending on the number of resources included in the first set of network resources allocated by the base station. That is, in some networks, a relatively large number of network resources might be allocated for D2D Communication whereas in some other networks a lower number of network resource might be allocated for the D2D communication. By way of example, when a UE moves from one network provider to another network provider (e.g., Home to Roaming area) the threshold number M could vary depending upon the new network provider's D2D implementation.

In one embodiment, selecting the next network resource from the current set of network resources in process block 614 includes selecting a random network resource from the set to be used for the shifting of the LTE-Direct connection. However, in another embodiment, a next network resource is found by applying a sub-frame offset to the sub-frame index of the currently selected network resource. As shown in FIG. 2, each network resource included in the set of network resources includes a sub-frame index 204. By way of example, a current network resource having a sub-frame index of 4 may be added to a sub-frame offset of 3, to arrive at network resource 202 of sub-frame index 7. In one embodiment, the sub-frame offset is inversely proportional to the threshold number M, such that the greater number of attempts made, the smaller the offset. This may account for the fact that network resources that are close or adjacent in the sub-frame index may suffer from similar interference, and thus, when the number of attempts is limited, it may be desirable to spread the search further among the available resource elements.

Figure 7:
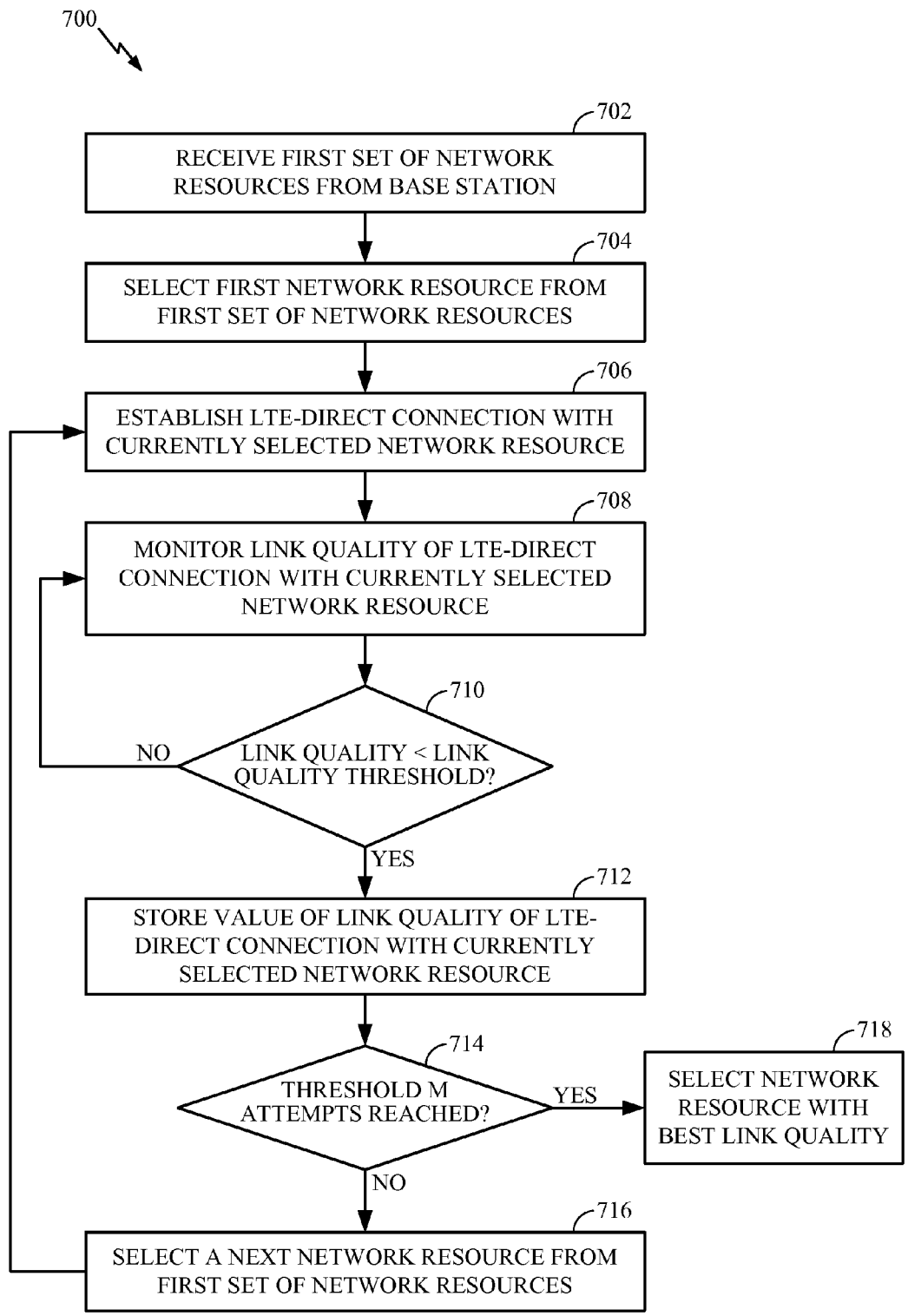
FIG. 7 is a flowchart illustrating an example process of link-quality-based resource allocation in a D2D communication session, including the selection of a network resource with the best link quality from among monitored network resources, according to various aspects.

FIG. 7 is a flowchart illustrating an example process 700 of link-quality-based resource allocation in a D2D communication session, including the selection of a network resource with the best link quality from among the monitored network resources, according to various aspects. Process 700 is one possible process performed by UE 102 and/or UE 104 of FIG. 1. Process 700 is similar to process 600, described above, with process blocks 702-710, 714, and 716 corresponding to process blocks 602-610, 612, and 614, respectively. However, process 700 includes additional process block 712 of storing the value of the link quality of the LTE-Direct connection for each network resource that is selected. Thus, if a network resource is selected that results in an LTE-Direct connection having a link quality that is below the link quality threshold, then the first UE may store the value of the link quality and an indication of the corresponding network resource (e.g., DRID) in memory (e.g., cache memory of the first UE). Then, if the threshold number M of attempts is reached in decision block 714, process block 718 includes selecting the network resource that resulted in an LTE-Direct connection with the best link quality. In this way, the D2D pair may continue the D2D communications with a selected network resource, despite none of them resulting in the LTE-Direct connection that satisfied the link quality threshold.

Figure 8:
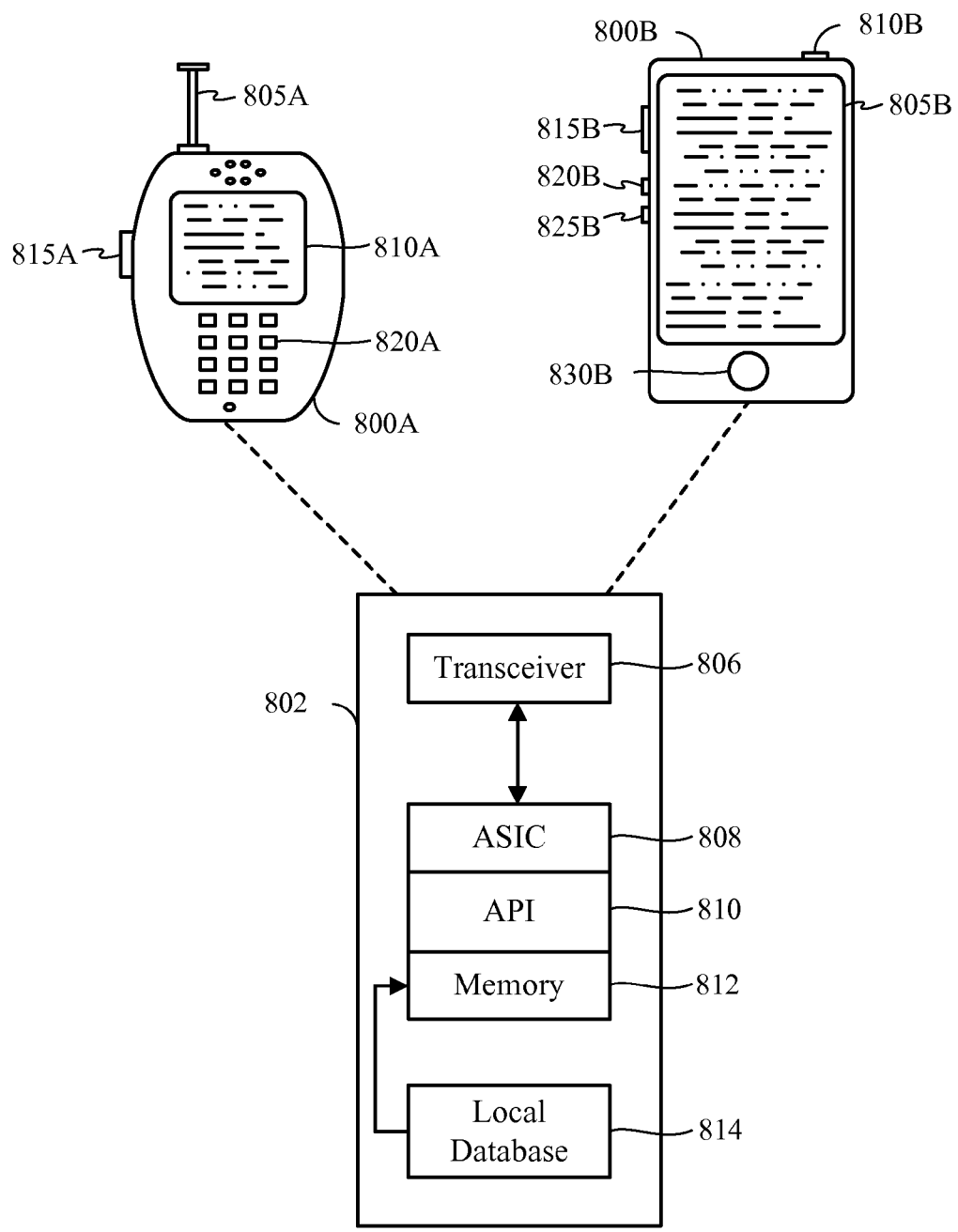
FIG. 8 is a functional block diagram illustrating example UEs that may support D2D communications and link-quality-based resource allocation, according to various aspects.

FIG. 8 is a functional block diagram illustrating example UEs that may support D2D communications and link-quality-based resource allocation, according to various aspects. UE 800A is illustrated as a calling telephone and UE 800B is illustrated as a touchscreen device (e.g., a smart phone, a tablet computer, etc.). As shown in FIG. 8, an external casing of UE 800A is configured with an antenna 805A, display 810A, at least one button 815A (e.g., a PTT button, a power button, a volume control button, etc.) and a keypad 820A among other components, as is known in the art. Also, an external casing of UE 800B is configured with a touchscreen display 805B, peripheral buttons 810B, 815B, 820B and 825B (e.g., a power control button, a volume or vibrate control button, an airplane mode toggle button, etc.), at least one front-panel button 830B (e.g., a Home button, etc.), among other components, as is known in the art. While not shown explicitly as part of UE 800B, the UE 800B can include one or more external antennas and/or one or more integrated antennas that are built into the external casing of UE 800B, including but not limited to Wi-Fi antennas, cellular antennas, satellite position system (SPS) antennas (e.g., global positioning system (GPS) antennas), and so on.

While internal components of UEs such as the UEs 800A and 800B can be embodied with different hardware configurations, a basic high-level UE configuration for internal hardware components is shown as platform 802 in FIG. 8. The platform 802 can receive and execute software applications, data and/or commands transmitted from the EPC 120 that may ultimately come from the core network 140, the Internet and/or other remote servers and networks (e.g., application server, web URLs, etc.). The platform 802 can also independently execute locally stored applications without EPC interaction. The platform 802 can include a transceiver 806 operably coupled to an application specific integrated circuit (ASIC) 808, or other processor, microprocessor, logic circuit, or other data processing device. The ASIC 808 or other processor executes the application programming interface (API) 810 layer that interfaces with any resident programs in the memory 812 of the wireless device. The memory 812 can be comprised of read-only or random-access memory (RAM and ROM), EEPROM, flash cards, or any memory common to computer platforms. The platform 802 also can include a local database 814 that can store applications not actively used in memory 812, as well as other data. The local database 814 is typically a flash memory cell, but can be any secondary storage device as known in the art, such as magnetic media, EEPROM, optical media, tape, soft or hard disk, or the like.

Accordingly, one embodiment disclosed herein can include a UE (e.g., UE 800A, 800B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 808, memory 812, API 810 and local database 814 may all be used cooperatively to load, store and execute the various functions disclosed herein and thus the logic to perform these functions may be distributed over various elements. Alternatively, the functionality could be incorporated into one discrete component. Therefore, the features of the UEs 800A and 800B in FIG. 8 are to be considered merely illustrative and the disclosure is not limited to the illustrated features or arrangement.

The wireless communication between the UEs 800A and/or 800B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments disclosed herein and are merely to aid in describing aspects of the embodiments disclosed herein.

Figure 9:
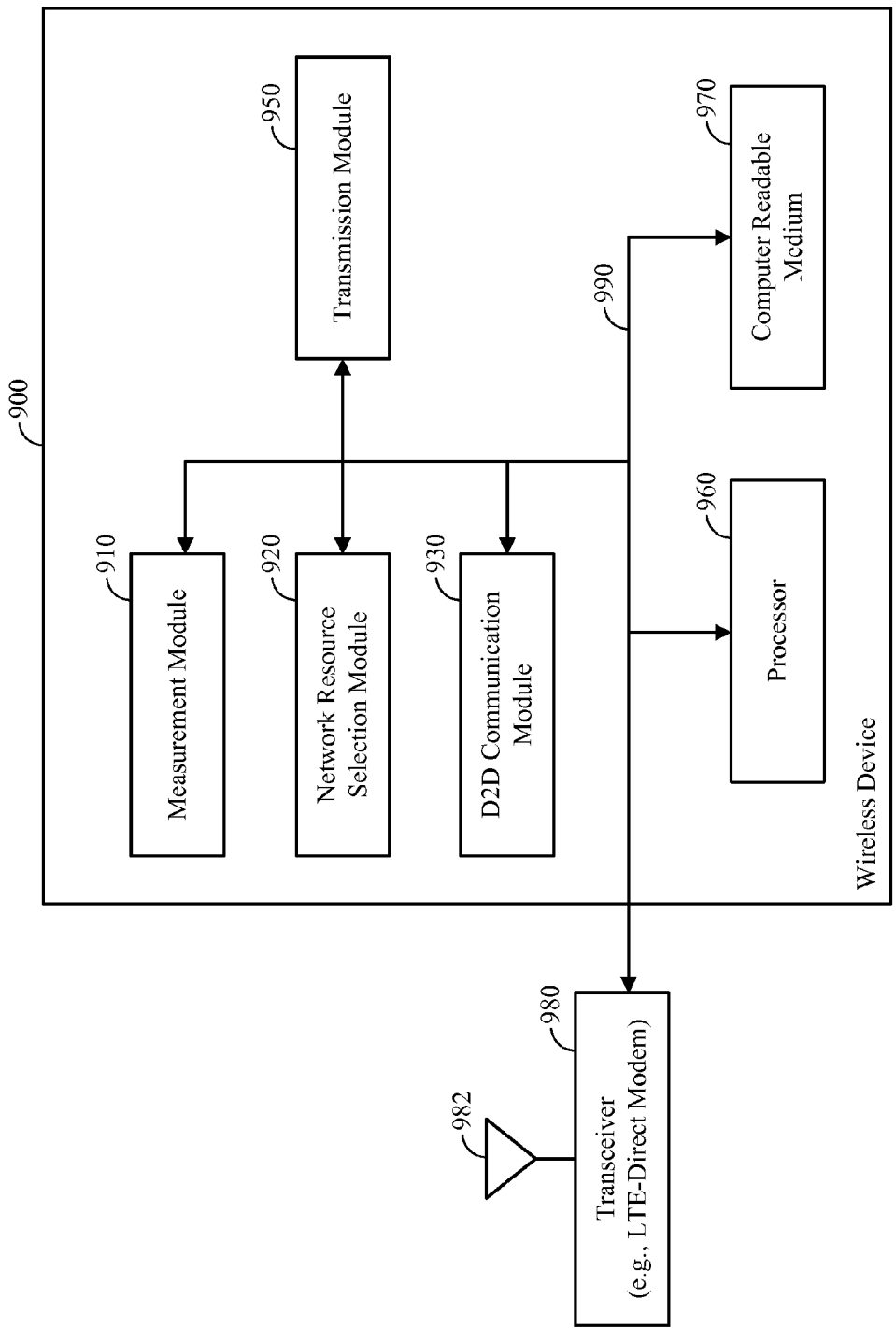
FIG. 9 illustrates an exemplary conceptual data flow between different modules, means, and/or components in an exemplary wireless device that may support D2D communications and link-quality-based resource allocation, according to the various aspects.

FIG. 9 illustrates an exemplary conceptual data flow between different modules, means, and/or components in an exemplary wireless device 900 that may support D2D communications and link-quality-based resource allocation, according to the various aspects.

In various embodiments, the wireless device 900 may include a processing system implemented with a bus architecture, represented generally by bus 990. The bus 990 may include any number of interconnecting buses and bridges depending on the specific application of the wireless device 900 and the overall design constraints. The bus 990 links together various circuits including one or more processors and/or hardware modules, represented by the processor 960, computer-readable medium 970, measurement module 910, network resource selection module 920, D2D communication module 930, and transmission module 950. The bus 990 may also link various other circuits such as timing sources, peripherals, voltage regulators, and power management circuits, which are well known in the art, and therefore, will not be described any further.

In various embodiments, the wireless device 900 may further include a transceiver 980, which may be coupled to one or more antennas 982. The transceiver 980 may provide a means (e.g., an LTE-Direct modem) for communicating with various other apparatuses over a transmission medium. The wireless device 900 includes a processor 960 coupled to the computer-readable medium 970, wherein the processor 960 may be responsible for general processing, including the execution of software stored on the computer-readable medium 970. The software, when executed by the processor 960, may cause the processor 960 to perform the various functions described in further detail above for any particular apparatus. The computer-readable medium 970 may also be used to store data that the processor 960 can then manipulate when executing software. The modules may be software modules running in the processor 960, resident/stored in the computer readable medium 970, one or more hardware modules coupled to the processor 970, or some combination thereof. The wireless device may further correspond to a UE and may include other suitable components as described herein (e.g., a memory, TX processor, RX processor, controller/processor, etc. as shown in connection with the UE 350 in FIG. 3).

In various embodiments, the measurement module 910 can be configured to measure one or more communication parameters of an LTE-Direct communication, such as reference signal received power (RSRP) and/or signal to noise ratio (SNR) of LTE-Direct communication exchanges with another UE. Network resource selection module 920 is configured to perform any of the link-quality-based resource allocations, discussed herein, such as processes 400, 500, 600, or 700.

In various embodiments, the wireless device 900 may include means for exchanging communication information between a first user equipment (UE) and a second UE over an LTE-Direct connection with a first network resource of a first set of network resources allocated to the first and second UEs by a base station for the LTE-Direct connection (e.g., D2D communication module 930); means for determining, by the first UE, whether a first link quality of the LTE-Direct connection with the first network resource is below a link quality threshold (e.g., measurement module 910); and means for shifting the LTE-Direct connection to another network resource of the first set of network resources until an LTE-Direct connection is established between the first UE and the second UE that has a link quality that is equal to or greater than the link quality threshold (e.g., Network Resource Selection Module 920).

In various embodiments, the above-mentioned means may be one or more of the aforementioned modules of the UEs 800A, 800B shown in FIG. 8, and/or the wireless device 900 shown in FIG. 9 that are configured or configurable to perform the functions recited in connection with the aforementioned means. As mentioned above, the wireless device may further include certain components associated with the UE 350 shown in FIG. 3, where in one example, the above-mentioned means may be the TX Processor 368, the RX Processor 656, the controller/processor 659, and/or other components associated with the UE 350 that are configured or configurable to perform the functions recited in connection with the above-mentioned means.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless device (e.g., an IoT device). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:
1. A method of network resource allocation for device-to-device (D2D) communication in an LTE-Direct communication system, the method comprising:
 exchanging communication information between a first user equipment (UE) and a second UE over an LTE-

Direct connection with a first network resource of a first set of network resources allocated to the first and second UEs by a base station for the LTE-Direct connection;

determining, by the first UE, whether a first link quality of the LTE-Direct connection with the first network resource is below a link quality threshold; and if so, shifting the LTE-Direct connection to another network resource of the first set of network resources until an LTE-Direct connection is established between the first UE and the second UE that has a link quality that is equal to or greater than the link quality threshold.

2. The method of claim 1, further comprising sending, by the first UE, a request to the base station for an allocation of a second set of network resources for the LTE-Direct connection between the first UE and the second UE.

3. The method of claim 2, further comprising determining a link quality of the LTE-Direct connection for a threshold number M of the network resources of the first set of network resources, and wherein the sending of the request to the base station for the allocation of the second set of network resources is in response to the first UE determining that the link quality of the LTE-Direct connection for each of the threshold number M of network resources is below the link quality threshold.

4. The method of claim 3, wherein each resource included in the first set of network resources includes a sub-frame index, and wherein shifting the LTE-Direct connection to another resource includes applying a sub-frame offset to the sub-frame index of a current network resource of the LTE-Direct connection.

5. The method of claim 4, wherein the sub-frame offset is inversely proportional to the threshold number M.

6. The method of claim 1, further comprising:
determining a link quality of the LTE-Direct connection for a threshold number M of the network resources of the first set of network resources; and
selecting the network resource of the threshold number M of network resources for the LTE-Direct connection with a best link quality in response to the first UE determining that the link quality of the LTE-Direct connection for each of the threshold number M of network resources is below the link quality threshold.

7. The method of claim 1, wherein shifting the LTE-Direct connection to another network resource of the first set of network resources comprises:
selecting a random network resource from the first set of network resources;
shifting the LTE-Direct connection to the random network resource; and
determining the link quality of the LTE-Direct connection with the random network resource.

8. The method of claim 1, wherein determining whether the first link quality of the LTE-Direct connection with the first network resource is below the link quality threshold comprises measuring, at the first UE, one or more communication parameters of the LTE-Direct connection with the first network resource.

9. The method of claim 8, wherein the one or more communication parameters comprise one or more of a reference signal received power (RSRP) and a signal to noise ratio (SNR) of the communication information exchanged between the first UE and the second UE.

10. An apparatus for allocating network resources for device-to-device (D2D) communication in an LTE-Direct communication system, the apparatus comprising:
memory adapted to store program code; and
a processing unit coupled to the memory to access and execute instructions included in the program code to direct the apparatus to:
exchange communication information between a first user equipment (UE) and a second UE over an LTE-Direct connection with a first network resource of a first set of network resources allocated to the first and second UEs by a base station for the LTE-Direct connection;
determine, by the first UE, whether a first link quality of the LTE-Direct connection with the first network resource is below a link quality threshold; and if so,
shift the LTE-Direct connection to another network resource of the first set of network resources until an LTE-Direct connection is established between the first UE and the second UE that has a link quality that is equal to or greater than the link quality threshold.

11. The apparatus of claim 10, wherein the program code further comprises instructions to direct the apparatus to send a request to the base station for an allocation of a second set of network resources for the LTE-Direct connection between the first UE and the second UE.

12. The apparatus of claim 11, wherein the program code further comprises instructions to direct the apparatus to determining a link quality of the LTE-Direct connection for a threshold number M of the network resources of the first set of network resources, and wherein the instructions to send the request to the base station for the allocation of the second set of network resources is in response to the first UE determining that the link quality of the LTE-Direct connection for each of the threshold number M of network resources is below the link quality threshold.

13. The apparatus of claim 12, wherein each resource included in the first set of network resources includes a sub-frame index, and wherein the instructions to shift the LTE-Direct connection to another resource includes instructions to apply a sub-frame offset to the sub-frame index of a current network resource of the LTE-Direct connection.

14. The apparatus of claim 13, wherein the sub-frame offset is inversely proportional to the threshold number M.

15. The apparatus of claim 10, wherein the program code further comprises instructions to direct the apparatus to:
determine a link quality of the LTE-Direct connection for a threshold number M of the network resources of the first set of network resources; and
select the network resource of the threshold number M of network resources for the LTE-Direct connection with a best link quality in response to the first UE determining that the link quality of the LTE-Direct connection for each of the threshold number M of network resources is below the link quality threshold.

16. The apparatus of claim 10, wherein the instructions to shift the LTE-Direct connection to another network resource of the first set of network resources comprises instructions to:
select a random network resource from the first set of network resources;
shift the LTE-Direct connection to the random network resource; and
determine the link quality of the LTE-Direct connection with the random network resource.

17. The apparatus of claim 10, wherein the instructions to determine whether the first link quality of the LTE-Direct connection with the first network resource is below the link quality threshold comprises instructions to measure, at the first UE, one or more communication parameters of the LTE-Direct connection with the first network resource.

18. The apparatus of claim 17, wherein the one or more communication parameters comprise one or more of a reference signal received power (RSRP) and a signal to noise ratio (SNR) of the communication information exchanged between the first UE and the second UE.

19. An apparatus for allocating network resources for device-to-device (D2D) communication in an LTE-Direct communication system, the apparatus comprising:
means for exchanging communication information between a first user equipment (UE) and a second UE over an LTE-Direct connection with a first network resource of a first set of network resources allocated to the first and second UEs by a base station for the LTE-Direct connection;
means for determining, by the first UE, whether a first link quality of the LTE-Direct connection with the first network resource is below a link quality threshold; and
means for shifting the LTE-Direct connection to another network resource of the first set of network resources until an LTE-Direct connection is established between the first UE and the second UE that has a link quality that is equal to or greater than the link quality threshold.

20. The apparatus of claim 19, further comprising means for sending, by the first UE, a request to the base station for an allocation of a second set of network resources for the LTE-Direct connection between the first UE and the second UE.

21. The apparatus of claim 20, further comprising means for determining a link quality of the LTE-Direct connection for a threshold number M of the network resources of the first set of network resources, and wherein the means for sending of the request to the base station for the allocation of the second set of network resources is in response to the first UE determining that the link quality of the LTE-Direct connection for each of the threshold number M of network resources is below the link quality threshold.

22. The apparatus of claim 19, further comprising:
means for determining a link quality of the LTE-Direct connection for a threshold number M of the network resources of the first set of network resources; and
means for selecting the network resource of the threshold number M of network resources for the LTE-Direct connection with a best link quality in response to the first UE determining that the link quality of the LTE-Direct connection for each of the threshold number M of network resources is below the link quality threshold.

23. The apparatus of claim 19, wherein the means for shifting the LTE-Direct connection to another network resource of the first set of network resources comprises:
means for selecting a random network resource from the first set of network resources;
means for shifting the LTE-Direct connection to the random network resource; and
means for determining the link quality of the LTE-Direct connection with the random network resource.

24. The apparatus of claim 19, wherein the means for determining whether the first link quality of the LTE-Direct connection with the first network resource is below the link quality threshold comprises means for measuring, at the first UE, one or more communication parameters of the LTE-Direct connection with the first network resource.

25. The apparatus of claim 24, wherein the one or more communication parameters comprise one or more of a reference signal received power (RSRP) and a signal to noise ratio (SNR) of the communication information exchanged between the first UE and the second UE.

26. A non-transitory computer-readable medium including program code stored thereon for allocating network resources for device-to-device (D2D) communication in an LTE-Direct communication system, the program code comprising instructions, which when executed by a processor, are configured to:
exchange communication information between a first user equipment (UE) and a second UE over an LTE-Direct connection with a first network resource of a first set of network resources allocated to the first and second UEs by a base station for the LTE-Direct connection;
determine, by the first UE, whether a first link quality of the LTE-Direct connection with the first network resource is below a link quality threshold; and if so,
shift the LTE-Direct connection to another network resource of the first set of network resources until an LTE-Direct connection is established between the first UE and the second UE that has a link quality that is equal to or greater than the link quality threshold.

27. The medium of claim 26, wherein the program code further comprises instructions to send a request to the base station for an allocation of a second set of network resources for the LTE-Direct connection between the first UE and the second UE.

28. The medium of claim 27, wherein the program code further comprises instructions to determine a link quality of the LTE-Direct connection for a threshold number M of the network resources of the first set of network resources, and wherein the instructions to send the request to the base station for the allocation of the second set of network resources is in response to the first UE determining that the link quality of the LTE-Direct connection for each of the threshold number M of network resources is below the link quality threshold.

29. The medium of claim 26, wherein the program code further comprises instructions to:
determine a link quality of the LTE-Direct connection for a threshold number M of the network resources of the first set of network resources; and
select the network resource of the threshold number M of network resources for the LTE-Direct connection with a best link quality in response to the first UE determining that the link quality of the LTE-Direct connection for each of the threshold number M of network resources is below the link quality threshold.

30. The medium of claim 26, wherein the instructions to shift the LTE-Direct connection to another network resource of the first set of network resources comprises instructions to:
select a random network resource from the first set of network resources;
shift the LTE-Direct connection to the random network resource; and
determine the link quality of the LTE-Direct connection with the random network resource.

* * * * *